June 30, 1959     L. ROSENBLUM     2,892,927

PHOTOGRAPHIC BOUNCE FLASH BRACKET

Filed Feb. 27, 1956

INVENTOR.
Louis Rosenblum
BY
Browsard McKulka
ATTORNEYS

United States Patent Office 2,892,927
Patented June 30, 1959

2,892,927
PHOTOGRAPHIC BOUNCE FLASH BRACKET

Louis Rosenblum, Belmont, Mass., assignor to Polaroid Corporation, Cambridge, Mass., a corporation of Delaware Application February 27, 1956, Serial No. 567,779

7 Claims. (Cl. 240—1.3)

The present invention relates to photography and more particularly to accessories for use in flash photography.

In conventional flash photography, photographs taken with the flash bulb at or near the camera and aimed directly at the subject are usually recognizable by flat, characterless lighting; small but harsh shadows if the subject is turned even slightly away from the camera; strong shadows on the background if the latter is near the camera or an inky void behind the subject if the background is more than a few feet distant; in group pictures, the subjects nearest the camera are usually fully exposed or overexposed, while those a few feet further away are underexposed. To improve their results, professional photographers started taking the flash gun off the camera and "bouncing" the light off the ceiling. This floods the average room with what appears to be softly diffused light and results in vastly improved photographs. However, this technique has one serious disadvantage in that it requires the photographer to hold the camera in one hand and the flashgun, directed at the ceiling, in the other, in many cases rendering the tripping of the camera shutter an awkward operation.

Accordingly, an object of the present invention is to provide an adapter or bracket so constructed that a first section or foot thereof is adapted for insertion into the accessory clip or shoe of a camera and at least one other section thereof is provided with a recess adapted to receive and temporarily retain a flashgun in such a manner when the camera with which the adapter and flashgun are associated is in "taking" position, the reflector of the flashgun is so positioned with respect to the camera that light striking the reflector will be directed at a given angle to the optical axis of the camera or, in other words, the optical axis of the flashgun is at a given angle to the optical axis of the camera.

Another object of the invention is to provide an adapter or bracket of the character described and which is provided with a plurality of recesses, one of the recesses being located in a second section of the adapter and being adapted for use in taking "vertical" pictures and the other of the recesses being located in a third section of the adapter and being adapted for use in taking "horizontal" pictures, the third section being at an angle of substantially 95 degrees to the second section.

Other objects of the invention will in part be obvious and will in part appear hereinafter.

The invention accordingly comprises an article of manufacture possessing the features, properties and the relation of components which are exemplified in the following detailed disclosure, and the scope of the application of which will be indicated in the claims.

For a fuller understanding of the nature and objects of the invention, reference should be had to the following detailed description, taken in connection with the accompanying drawing, wherein.

Figure 1:
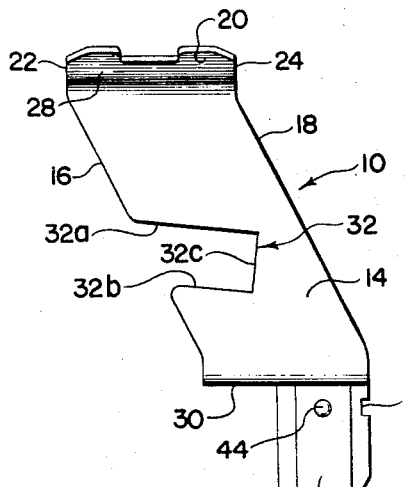
Figure 1 is a plan view of the bounce flash adapter of the invention.

The bounce flash adapter or bracket of the invention, illustrated generally at 10, comprises a unitary rigid element formed of sheet metal or like material, preferably of the order of one-sixteenth of an inch thick, and comprising a substantially rectangular foot or first section 12 adapted for engagement with the accessory clip of a camera, a second, comparatively elongated section 14 having substantially parallel lateral edges 16 and 18, said second section extending in a plane substantially parallel with the plane of said first section and having its edges 16 and 18 disposed angularly with respect to the edge 38 of the first section, and a third, substantially rectangular section 20 upstanding at an angle of substantially 95° from the end of said second section remote from said first section and having substantially parallel lateral edges 22 and 24.

Figure 4:
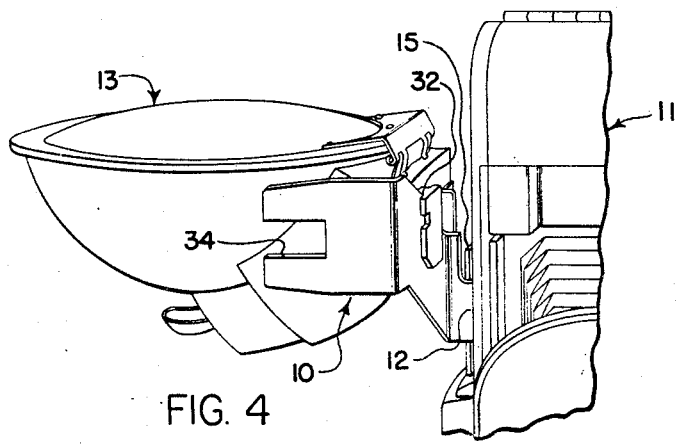
Fig. 4 is a perspective view, showing the adapter of the invention in association with a camera and flashgun and in position to take "vertical" pictures.

Depending upon the type of camera with which the adapter or bracket of the present invention is to be associated, it may be desirable to elevate second section 14 above the plane of the surface of the camera (designated generally by 11 in Fig. 4) on which the accessory clip is located in order to provide ample clearance for the mounting member of a flashgun (indicated at 13 in Fig. 4). Accordingly, the adapter or bracket 10 of the present invention is shown as comprising a fourth section 26 extending between sections 12 and 14 and at an angle of substantially 90 degrees to said sections.

Referring particularly to Fig. 1, 28 and 30 designate, respectively, the lines of juncture between second section 14 and third section 20, and second section 14 and fourth section 26, said lines being substantially parallel with each other.

At least one of sections 14 and 20 is provided with a recess adapted for engagement with the mounting member of a flashgun. In the form of the invention illustrated in the drawing, each of sections 14 and 20 is provided with such a recess. As shown in Fig. 1, section 14 is provided with a recess 32 defined by sides 32a and 32b and end 32c.

It has been found that best results are obtained with bounce flash methods of the character described herein when the flashgun is additionally tilted forwardly (toward the subject being photographed) at an angle of substantially 5 degrees from the vertical, thus ensuring that little, if any, of the reflected light will be lost to the rear of the photographer. This preferred positioning of the flashgun is effected by locating sides 32a and 32b of recess 32, which extend from edge 16 toward edge 18, at an angle of substantially 5 degrees with respect to line of juncture 28 and line of juncture 30, and substantially mediate said lines of juncture 28 and 30.

Figure 3:
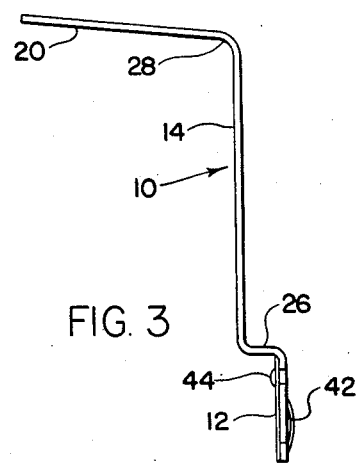
Fig. 3 is a side elevational view of the adapter shown in Fig. 1.
Figure 2:
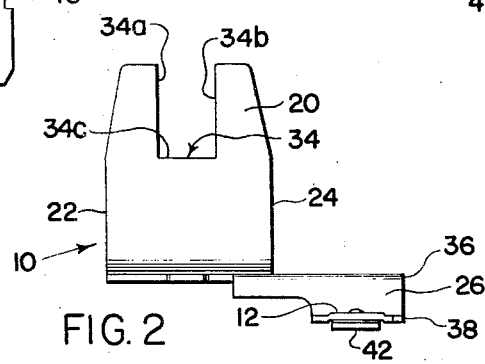
Fig. 2 is a rear elevational view of the adapter shown in Fig. 1.

As previously mentioned, third section 20 is located at an angle of substantially 95 degrees to second section 14 (Fig. 3). This 95 degree, rather than 90 degree, angle is again for the purpose of properly directing the reflected light from the flashgun, this time when the camera is being employed for the taking of horizontal pictures. As best shown in Fig. 2, third section 20 is provided with a recess 34 in the end thereof remote from second section 14, recess 34 being centrally located between edges 22 and 24 of section 20 and being defined by sides 34a and 34b, which are shown as being substantially parallel with edges 22 and 24 of section 20, and by end 34c, which is shown as being substantially perpendicular to edges 22 and 24 of section 20.

The foot or first section 12 of the bracket or adapter of the invention is offset to the right (viewing Figs. 1 and 2) with respect to third section 20 by reason of its laterally offset attachment to section 26 and said angular disposition of edges 16 and 18 of section 14, and its width is substantially less than the width of sections 14, 20 or 26, the edge 38 of section 12 being flush with edge 36 of section 26.

While not an essential of the present invention, section 12 may, if desired, be provided with a notch 40 (Fig. 1) adapted to be engaged and held by a latch associated with the accessory clip or shoe of the camera being employed, and/or a spring 42 comprising a curved strip of resilient metal and affixed to section 12 by any suitable fastening means, such as a rivet 44. Either or both of these elements assist in more snugly seating the foot 12 in the accessory clip of a camera.

Figure 4 illustrates the bounce flash adapter or bracket 10 of the invention in association with a camera 11 and flashgun 13 and in operative position for the taking of "vertical" pictures. As there shown, foot 12 is seated in the accessory clip 15 of the camera and the flashgun is engaged and held by recess 32. If a "horizontal", rather than a "vertical" picture is desired, the foot 12 is allowed to remain in the accessory clip of the camera and the flashgun is inserted into and retained by recess 34 instead of recess 32. With respect to the device of the present invention, in the form shown it is designed for attachment, respectively, to an accessory clip of a camera having a principal engaging surface substantially parallel to the optical axis of the camera, and to a mounting element of a flashgun having a principal engaging surface substantially parallel to the optical axis of the flashgun.

An important feature of the present invention resides in the provision of a bounce flash adapter or bracket which is so constructed that, when operatively associated with a camera and flashgun, it permits the flashgun to be positioned in such a manner that light striking the reflector of the gun will be reflected at a predetermined angle relative to the optical axis of the camera, and this is true whether the flashgun is engaged by recess 32 (employed when taking vertical pictures) or recess 34 (used in taking horizontal pictures).

The bounce flash adapter of the invention is particularly adapted for use with self-developing cameras of the type sold by Polaroid Corporation as "Polaroid Land Cameras" and as illustrated for example by Design Letters Patent No. 152,229, issued December 28, 1948, to Walter Dorwin Teague et al. Specifically, the bounce flash adapter of the invention is intended for use with all models of self-developing cameras marketed by Polaroid Corporation, with the exception of their Model 80 or "Polaroid Highlander Land Camera."

While the bounce flash bracket or adapter of the present invention has been described hereinabove only with respect to its preferred embodiment, it will, of course, be obvious that certain modifications in the construction thereof may be effected without departing from the spirit or scope of the invention. For example, third section 20, i.e., that section adapted for use in connection with the taking of horizontal pictures, has been described and illustrated as being at an angle of substantially 95 degrees to second section 14. Under certain circumstances, however, it may be desirable to cause a portion of the light from the flashgun to be directed toward the ceiling and another portion directed toward the adjoining wall to the rear of the subject; this may be accomplished by varying the angle between the second and third sections from the angle shown to one, for example, which is substantially less than a right angle. As a further example of modification, the shape of second section 14 may vary from one wherein it is comparatively elongated (as in the preferred embodiment) to one wherein it is as wide as it is long. These and other modifications which may be apparent to one skilled in the art are to be construed as falling within the scope of the present invention.

Since certain changes may be made in the above article without departing from the scope of the invention herein involved, it is intended that all matter contained in the above description or shown in the accompanying drawing shall be interpreted as illustrative and not in a limiting sense.

What is claimed is:

1. In combination with a camera including an accessory clip having a principal engaging surface which is substantially parallel with the optical axis of the camera and with a flashgun including a mounting element having a principal engaging surface which is substantially parallel with the optical axis of the flashgun, a bracket for attaching said flashgun to said camera whereby light from the flashgun is predominantly directed upwardly and forwardly at a given angle to the optical axis of the camera for reflection from an overhead surface onto the subject of a photographic exposure, said bracket being in the form of a unitary rigid structure comprising a first section so slidably engageable with the accessory clip of a camera that, when engaged therewith, said first section lies in a plane substantially parallel with the optical axis of the camera, a second comparatively elongated section extending in a plane substantially parallel with the plane of said first section and a third section extending at an obtuse angle from the end of said second section remote from said first section, and a fourth section intermediate said first and second sections, integral therewith and extending substantially at 90° relative thereto, at least said third section being provided with a recess extending inwardly from its outer extremity and having substantially parallel sides for slidable reception of the mounting element of said flashgun, when said first section is mounted in said accessory clip and said mounting element of the flashgun is mounted in said recess of the third section, the aforesaid angular and coplanar relation of said sections taken with said recess providing a disposition of the optical axis of said flashgun at an angle of slightly less than 90° with respect to the optical axis of said camera and thereby providing said direction of light rays upwardly and forwardly.

2. A bracket as defined in claim 1 wherein is additionally included a recess extending inwardly from an edge of the second section and having parallel sides which are, respectively, acutely angularly disposed to the joining edges of the second section with other sections, said recess providing an alternate means for receiving the mounting element of a flashgun.

3. An adapter for mounting a flashgun on a camera to provide the reflection of light rays from said flashgun from an overhead surface downwardly upon the photographic subject when the camera is held for taking either a vertical or a horizontal picture, said adapter comprising a generally flat parallel-edged foot member adapted to be slidably inserted into and to releasably lock with an accessory clip located on one side of the camera, a relatively short flat member of substantially greater width than that of said foot member integral with said foot member and extending substantially at a 90° angle therefrom, a relatively long flat parallel-edged member integral with an extending substantially at a 90° angle from the second-named member in a plane generally parallel with that of said foot member, the parallel edges of said relatively long member extending in a direction away from said foot member in said plane parallel therewith at a given oblique angle, a parallel-sided recess formed to extend obliquely inwardly from that edge of said relatively long member which, owning to the oblique angle at which the latter extends, is most remote from said foot member, the sides of said recess being non-parallel with the lines of juncture of said second-named member which connect, respectively, with said foot member and with said relatively long member, said recess being adapted to receive the mounting element of said flashgun for obtaining said reflection of light rays while taking a vertical picture, a member integral with and extending at a given oblique angle from said relatively long member, and a parallel-sided recess formed so as to be directed inwardly substantially at a 90° angle from the extremity of said member extending from said long member at said oblique angle, said recess being adapted to receive the mounting element of said flashgun for obtaining said reflection of light rays while taking a horizontal picture.

4. An adapter for mounting a flashgun on a camera as defined in claim 3 wherein said foot member is slidably insertable into the accessory clip of the camera in a direction parallel with the optical axis of the objective lens of the camera and wherein said foot member comprises a spring element for frictional engagement with said accessory clip.

5. An adapter for mounting a flashgun on a camera as defined in claim 3 wherein said foot member, being of lesser width than said second-named member, extends from a noncentered portion of the latter so as to be offset with respect thereto, and wherein said offset position of the foot member taken with the obliquity of the relatively long member contributes to a wide spacing between the light-transmitting area of the flashgun and the lens of the camera.

6. An adapter for mounting a flashgun on a camera as defined in claim 3 wherein said last-named integral member extends at an obtuse angle from said relatively long member.

7. An adapter for mounting a flashgun on a camera as defined in claim 3 wherein the parallel sides of said recess formed in said relatively long member extend substantially at an angle of 5° with respect to the line of juncture between the second-named member and the relatively long member and wherein said last-named integral member extends obtusely substantially at an angle of 95° from said relatively long member, said angular extensions providing reflection of said light rays from said overhead surface at an obtuse angle to insure that a preponderance of said rays are reflected forwardly of said camera so as to fall upon said subject.

References Cited in the file of this patent

UNITED STATES PATENTS

| | | |
|---|---|---|
| 1,540,959 | Schumacker | June 9, 1925 |
| 2,269,947 | Ludwig | June 13, 1942 |
| 2,614,471 | Markowitz | Oct. 21, 1952 |
| 2,719,469 | Sanford | Oct. 4, 1955 |
| 2,791,392 | Black | May 7, 1957 |